Figure 6:
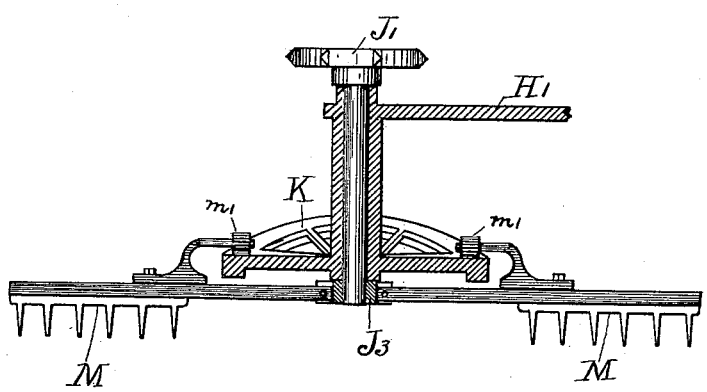

(No Model.) 3 Sheets—Sheet 1.
G. H. SPAULDING.
HARVESTER.
No. 373,494. Patented Nov. 22, 1887.
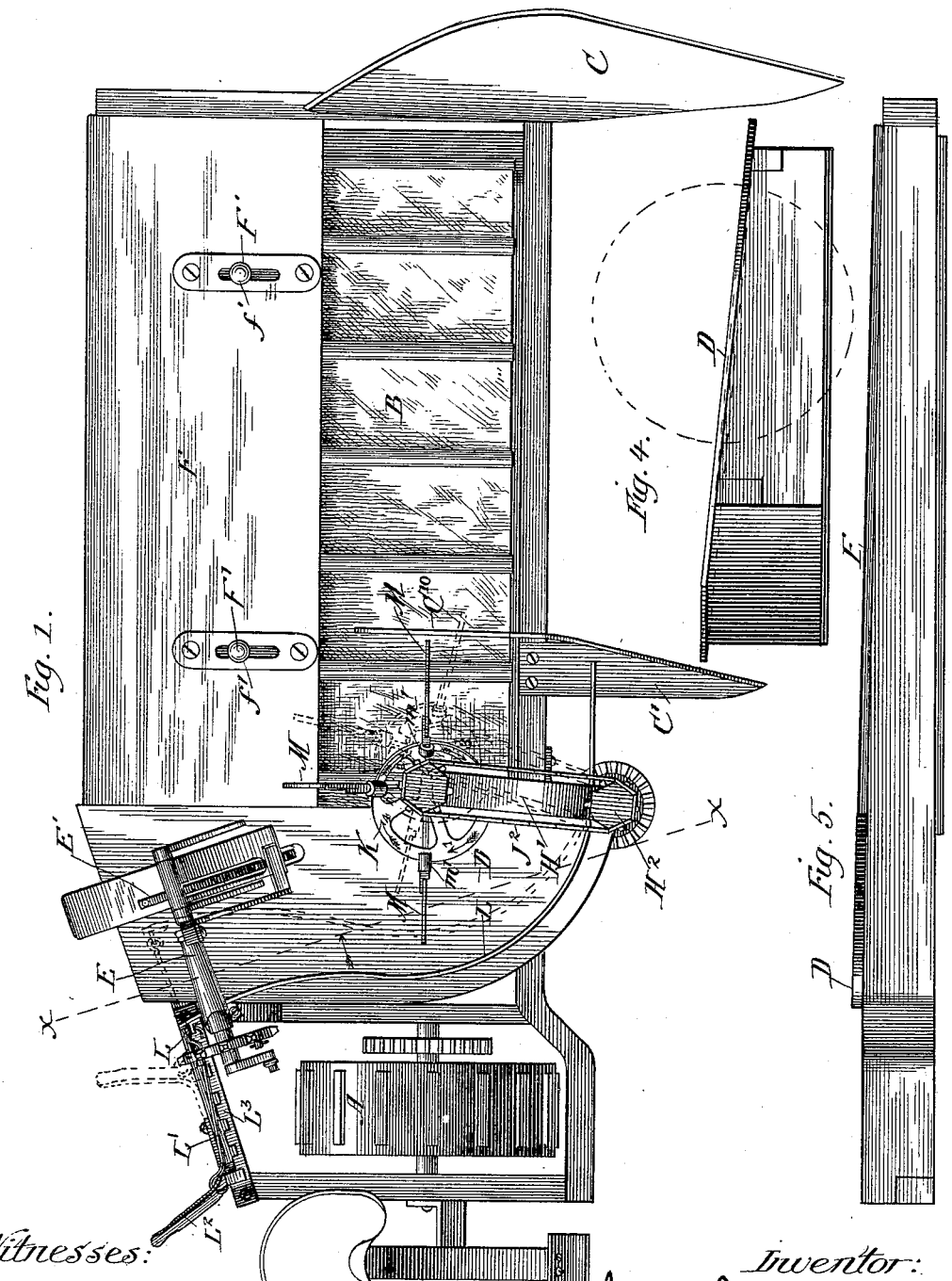
Witnesses:
Howard B. Hallock
Frank B. Blanchard
Inventor:
Geo. H. Spaulding
By Chas. D. Burton
Attorney.

(No Model.) 3 Sheets—Sheet 2.
G. H. SPAULDING.
HARVESTER.
No. 373,494. Patented Nov. 22, 1887.
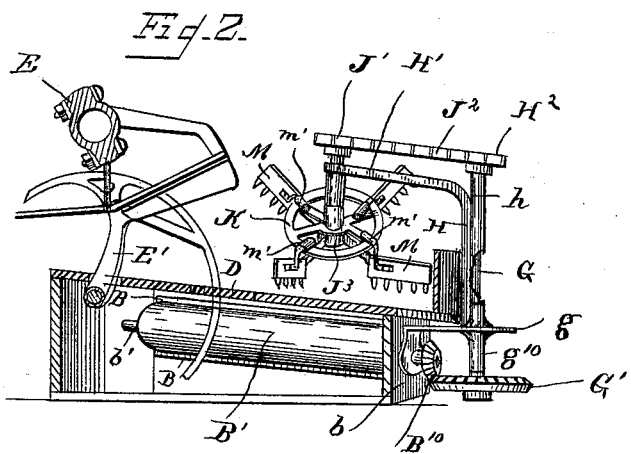
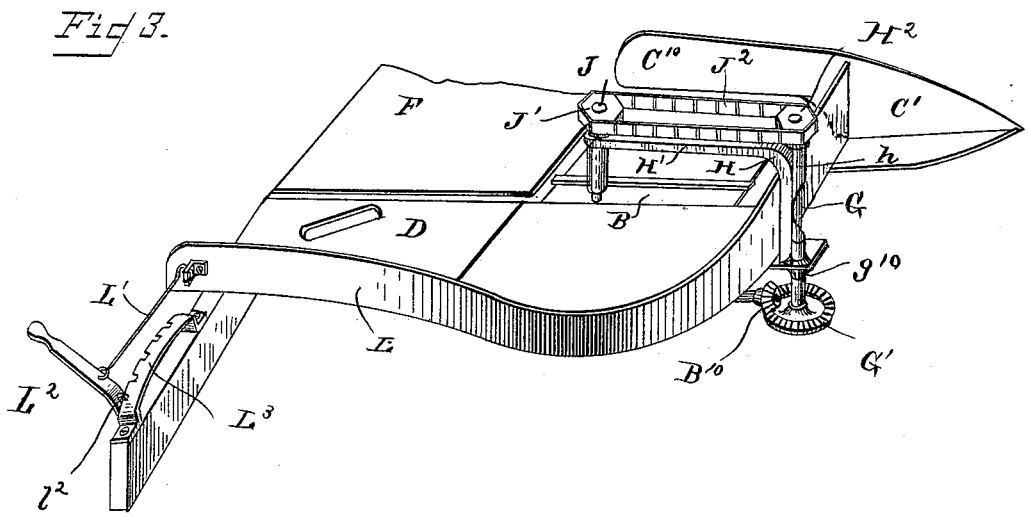
WITNESSES:
Ira R. Steward
Francis W. Parker
INVENTOR:
Geo. H. Spalding
by Chas. D. Burton
his atty.

(No Model.) 3 Sheets—Sheet 3.

G. H. SPAULDING.
HARVESTER.

No. 373,494. Patented Nov. 22, 1887.

Witnesses—
C. F. Burton
John Nettenstrom

Inventor—
Geo. H. Spalding
By Chas. D. Burton
Atty.

UNITED STATES PATENT OFFICE.

GEORGE H. SPAULDING, OF CHICAGO, ILLINOIS, ASSIGNOR TO WILLIAM DEERING, OF SAME PLACE.

HARVESTER.

SPECIFICATION forming part of Letters Patent No. 373,494, dated November 22, 1887.

Application filed January 31, 1887. Serial No. 226,098. (No model.)

*To all whom it may concern:*

Be it known that I, GEORGE H. SPAULDING, a citizen of the United States, residing at Chicago, in Cook county, in the State of Illinois, have invented a certain new and useful Improvement in Harvesters, which is fully described in the following specification, reference being had to the accompanying drawings, forming a part thereof.

The purpose of this invention is to provide means for delivering the grain from the platform-conveyer of a harvesting-machine to the binder located approximately at the same level, and to turn the grain in so delivering it to such an extent and in such a manner that the bundle may be discharged behind the driving-wheel, or at least rearward of the transverse plane thereof.

It comprises, to that end, a peculiar arrangement of conveyer-platform and binder-deck, so that the latter forms substantially a continuation of the former, a novel device for turning the grain as it is delivered from the platform-conveyer, and a novel means for adjusting the butt guiding and restraining device, and simultaneously therewith the grain-deflecting device, to adapt them to the length of the grain and cause the latter to be delivered to the binder in proper position corresponding with its length. I have also combined with these features means for preventing the heads of the grain from becoming entangled as the grain is deflected at the discharge side of the conveyer, and also at the same time adapted to prevent it from being carried down by the conveyer at the discharge side and choking the throat.

In the drawings, Figure 1 is a plan of so much of a harvester as is necessary to illustrate my invention, comprising a conveyer-platform, binder-deck, and enough of a binder-frame to show its location. Fig. 2 is a section at the line X X of Fig. 1. Fig. 3 is a detail perspective of the butt-board or butt-guiding device and the frame to which it is attached and the means of adjusting the same, all being shown in their relation to the platform-conveyer and binder-deck, which are partly shown. Fig. 4 is an outer or stubble end elevation of the harvester-frame, all mechanism being removed. Fig. 5 is a front elevation of the same. Fig. 6 is a vertical section of the butt-actuating rake-head and rakes at the line through the center of the bracket H'.

A is the drive-wheel; B, the platform-conveyer, which, as illustrated, is an endless belt of the usual form for such purpose.

C is the outside divider; C', the inside divider or gatherer.

D is the binder-deck.

E is the binder-frame; E', the binding arm or needle.

F is a cover—it may be of board or sheet metal—which overlaps the rear portion of the platform-conveyer B, being supported upon the frame of the platform in any convenient manner and made adjustable backward and forward, so that it may cover as great a portion of the width of the conveyer as may be necessary for its purpose, as hereinafter explained.

The conveyer-platform B extends stubbleward beyond the vertical plane of the inside divider, C', a considerable distance, as shown in Fig. 1, and at its discharge side the binder-deck D is located at substantially the same level as the conveyer-platform. The conveyer-platform and the binder-deck form thereby substantially a continuous grain-supporting surface, and this surface is slightly inclined, the direction of its upward slope being stubbleward and rearward, so that the highest point is the rear stubbleward corner and the lowest point the forward grainward corner—that is, the corner at the grain end of the sickle. This slope is illustrated in Fig. 2, which is a vertical section cut exactly in the direction of the slope, which is also preferably precisely the direction of the plane of the binder-arm. This direction is not sufficiently oblique to the line of travel to prevent the front edge of the platform being nearly enough horizontal for practical purposes, but is sufficient to give such slope to the binder-deck as is necessary in order that the grain may be satisfactorily handled thereon, and also that room may be obtained underneath the deck for the play of the binder-arm or needle.

The cover F lies over the rear portion of the conveyer and is exactly flush with the binder-deck D, and only by the amount of the thickness of such cover does the level of that deck (excepting as affected by the slope described) differ from that of the conveyer-platform. This cover is designed to be adjusted over the conveyer B according to the length of the grain, and in all cases to extend far enough forward so that the heads of the grain, when it is severed and falls upon the platform, shall rest upon said cover, whereby the retardment of the butts commonly experienced is approximately equaled by the retardment of the heads resting upon the cover F, so that the grain is kept more nearly at right angles with the line of travel as it is carried stubbleward by the conveyer. The further use of this cover will be explained in its relation to the binder-deck, and the grain-deflecting devices will be hereinafter described.

B' is the driving-roller of the platform-conveyer, which may receive motion in any convenient manner from the driving-train of the harvester, which is not illustrated. To the forward end of the shaft $b'$ of this roller is secured the bevel-pinion $B^{10}$, and in the bracket $g$, which is secured to the front sill, $b$, of the platform, there is journaled a vertical shaft, G, having on its lower end the bevel-gear G' and on its upper end a sprocket-wheel, $H^2$. Between the said sprocket-wheel and the bearing $g^{10}$ of the shaft G in the bracket $g$ there is pivoted on said shaft G the bracket H, the sleeve $h$, integral with said bracket, forming the bearing of the bracket on the shaft. Said bracket has an arm, H', extended rearward, overhanging the inner end of the platform-conveyer, and in the rear end of the said overhanging arm there is journaled the shaft J, having at its upper end, above said arm, the sprocket-wheel J', which is connected by the chain $J^2$ with the sprocket-wheel $H^2$ and driven thereby. The bearing of said shaft J is extended downward from the overhanging arm H', and terminates at the lower end in the cam K. The shaft J extends entirely through the said bearing, and below the said cam it has secured to it a collar, $J^3$, to which are pivoted rakes M, which are controlled in their movement by the cam K, hereinafter described.

To the rear side of the upright arm of the bracket H is secured the butt-guiding device or "butt-board" L, which extends grainward nearly to the inside divider, C', and stubbleward, first curving to the rear and then extending more directly rearward, and afterward turning stubbleward and rearward past the binder-gear standard to the discharge end of the binder-deck. At the rear end said butt-guide L is connected by a link, L', to the lever $L^2$, pivoted on the harvester-frame and adapted to rock in a vertical plane, whereby said lever serves to adjust the butt-board at the rear end toward and from the vertical plane of the binder arm or needle, and in so doing serves to swing the entire bracket H, to which it is connected, about the shaft G, upon which said bracket is pivoted, thereby carrying the grain-deflecting devices, consisting of the rakes M and their operating mechanism, grainward or stubbleward as the butt guide is moved toward or from the plane of the needle. Upon the harvester-frame is secured a notched bar, $L^3$, and the lever $L^2$ has a tooth, $l^2$, adapted to engage in the notches and lock the lever and its connected devices in any position to which they may be adjusted. Said lever is preferably sufficiently elastic to be held close enough to the harvester-frame by its pivot, so that it tends to spring toward the rack $L^3$ to hold its said tooth $l^2$ in engagement with the notches.

The rakes M are each provided with a projection from their upper back edges, and said projections afford bearings for the anti-friction rolls $m'$, which overhang and travel upon the cam K. The shape of said cam is such that the course of the rakes is caused thereby to be approximately in a plane oblique to the plane of the conveyer-surface, slanting downward, forward, and stubbleward toward that surface, so that through the quarter of their course (indicated by arrow-head No. 1 on Fig. 1) in which they are traveling stubbleward and rearward said rakes travel approximately in contact with the binder-deck, and through the quarter of their movement wherein they overhang the conveyer and are moving grainward and forward (indicated by arrow No. 2) they are considerably elevated above the surface of the conveyer, and in the quarter wherein they overhang the conveyer and are moving forward and stubbleward (see arrow-head No. 3,) they are approaching the surface of the binder-deck, and in the quarter in which they are moving grainward and rearward and overhang the binder-deck (see arrow-head No. 4) they are departing from it. The cam may be made somewhat irregular in form, so that the rakes may travel in contact with the binder-deck through the quarter first named and may approach it and depart from it more abruptly than if their course were strictly in the oblique plane described; but the variation from that plane will not be very great nor very material.

The operation of this structure in so far as it is peculiar I will now describe. When the grain is severed by the sickle and falls upon the platform, the heads will rest upon the cover F, which should be adjusted to a suitable position corresponding with the length of the grain, so that it may receive the heads. This will cause the heads to be retarded slightly, and as the conveyer B carries the grain stubbleward this retardment will partially equalize the retardment almost always experienced at the butts. The inside divider, C', is prolonged to the rearward in the extension $C^{10}$, which overhangs the conveyer, but is cut away at the under side, so that ample room is allowed for the passage of the grain below it;

and the body of the grain lying upon the conveyer, if at any time greater than can pass under said overhanging extension C$^{10}$, will be thereby restrained and distributed to such portions succeeding as are thinner. The body of the grain that is thus delivered within the reach of the deflecting rakes M will be rendered approximately uniform. The slope of the conveyer-platform and binder-deck upward toward the rear stubble-corner, as hereinabove described, causes the said grain in being carried stubbleward also to be carried slightly upward, and the heads especially are being elevated as the grain progresses stubbleward. Having passed beyond the vertical plane of the inside divider, or, to speak more exactly, beyond the vertical plane of the extension C$^{10}$, and being still upon the conveyer, the butts of the grain come within reach of the rakes M, which are descending stubbleward and forward over that portion of the conveyer, and as said rakes enter and engage the grain at the butts they carry the butts around toward the rear, while the heads still rest upon the cover F. In this process the butt-guide or butt-board L, restraining and directing the movement of the butts of the grain as it is swung by the rakes, forces it lengthwise while it is being deflected by compelling the butts to follow the outline of said butt-board, so that by the time the grain has been carried by the rakes into a position approximately at right angles to the vertical plane of the binder-arm the heads have been pushed rearward and grainward upon the cover F, which thus operates substantially as an extension of that part of the binder-deck and serves to support the grain in process of binding from this stage forward until the bundle is discharged. Additional grain brought in by the conveyer toward the binder-deck will encounter at the head the heads of this grain first carried around into the position described ready for binding, and will be retarded thereby at the heads while it is seized and advanced or deflected at the butts by the rakes M. The position, therefore, of the heads of the grain lying on the cover F while being bound is such as to assist the process of turning the subsequently-delivered grain into that position. It will be noticed, also, that by reason of the fact that the heads of the grain rest upon the cover F (if said cover is properly adjusted and if the grain is properly laid by the reel) there can be very little tendency or possibility of the grain being carried down at the end of the conveyer, causing it to choke the throat; but, one end of the grain being already on the support, which is flush with and merges in the binder-deck, the carrying action of the conveyer itself will tend to lodge the entire length of the grain on the same supporting-surface, and when this action is supplemented by the further action of the overhanging deflecting-rakes the result is approximately certain and the danger of choking is very slight.

It should be further noticed that by the sloping of the conveyer-platform and binder-deck continuously the abrupt change of direction or elevation of the grain is prevented, and, notwithstanding, sufficient slope is obtained at the position where the binding mechanism operates to enable said mechanism to operate properly upon the grain in packing and binding it.

Grain lying upon an inclined plane tends, under the influence of gravity, to roll down the incline in the steepest direction and to assume a position at right angles to that direction, which is a horizontal position. The needle in order best to encompass the bundle should move at right angles to the bundle, and this direction will therefore be the direction in which the bundle tends to descend—namely, the direction of the greatest inclination. The vertical plane of the needle's movement is the plane of the needle-slot, which will therefore be at right angles to a horizontal line in the surface of the binder-deck, and the slope of the deck being, as described, upward from the inner (or grainward) forward corner to the outer (or stubbleward) rear corner both the needle-slot, or the vertical plane of the needle's movement, and the direction of a horizontal line in the deck will be oblique to the line of travel and to the direction of the conveyer and sickle movement. This is not the only reason, however, for locating the binder, as illustrated and described, so that the binder-arm operates in a plane oblique to the vertical plane of the platform-conveyer. It is necessary, or at least I consider it desirable, to deliver the grain to the rear whether directly or obliquely, in order not to require the space inside the track of the wheel for such delivery. Furthermore, it is desirable not to locate the binder farther toward the rear than necessary, on account of its weight tending, if it is located too far rearward, to make it difficult to balance the machine; also, some amount of space is necessary in which to accumulate grain in the intervals of binding, and in which by different devices the grain is handled that it may be evened up preparatory to binding. Now it would require, in addition to the space mentioned for that purpose, further space in which to turn equal to the full length of the grain if it were to be given a full quarter-turn without causing the heads to overlap each other—that is, if it were turned about a center located beyond the heads; but if the grain were turned about a center below the heads and were caused to make a full quarter-turn, so that the bundle might be discharged directly to the rear, so that the binding-arm might operate in a plane parallel with the line of travel—that is to say, at right angles with the vertical plane of the conveyer movement—the grain while lying in such position and being bound would lap so far over onto the conveyer that it would prevent the incoming grain from reaching the deflecting-rakes in proper position and direction to be suitably operated upon by them, and would in fact be forced into a position almost lengthwise of the conveyer and the heads would be forced off of the supporting-board, and the advantage of that support, as above described, would thereby be lost and the grain would in many cases be carried down lengthwise at the end of the conveyer into the throat, and the conveyer be choked.

By locating the binder in an oblique position, however, the grain is turned into a suitable position to be operated upon, and thus does not so far obstruct the stubbleward end of the cover F as to prevent it from performing its principal function of guiding the grain onto the binder-deck, whereby I am able to utilize a certain amount of the space stubbleward from the vertical plane of the inside divider, C', and forward edge of the cover F for the double purpose of a binder-deck and a grain-receptacle, thereby diminishing the lateral compass of the machine.

By means of the lever L² and its connection to the butt-board L the latter is adjusted so that the grain is delivered to the binder in position to receive the band about the middle, whatever be its length. This butt board, being rigid with the bracket which supports the grain-deflecting rakes, carries the said bracket and rakes with it in its adjustment, so that the latter in all positions of the device operate in the same relation to the butt-board—that is to say, always act upon the butts at the same distance from the extreme ends thereof.

The cover F may be arranged to be adjusted back and forward in any convenient simple manner. I have shown it guided upon the rear sill by means of the stud F', upon which the clamp-nuts f' afford means for securing the cover in any position to which it may be adjusted.

I claim—

1. In combination with the platform-conveyer which moves sidewise behind the sickle, the binder-deck located at the delivery side of the conveyer, both the conveyer and the deck being in substantially the same plane, sloping continuously and uniformly upward toward the rear and toward the stubble side, substantially as set forth.

2. In combination, the receiving-platform of a self-binding harvester, the binder-deck, said platform and deck being substantially in the same plane, sloping continuously uniformly upward toward the rear and toward the stubble side, and the binder arm or needle operating in a vertical plane oblique to the direction of travel, and which agrees substantially with the vertical plane of the slope of the deck and platform.

3. In combination, the platform-conveyer which moves the grain sidewise from behind the sickle, which extends stubbleward beyond the vertical plane of the inside divider, the binder-deck at substantially the level of the discharge side of the conveyer, the butt-deflecting rakes rotating over that portion of the conveyer which is located stubbleward from the vertical plane of the divider and over the binder-deck, the orbit-plane of said rakes being inclined downward toward the front and stubble side, substantially as set forth.

4. In combination, the platform-conveyer moving the grain sidewise from behind the sickle, extending stubbleward beyond the vertical plane of the divider C', the binder-deck at the discharge side of the conveyer and substantially at the same level, the cover F, overlying the rear portion of the conveyer and terminating at its stubble end flush with the binder-deck, and the butt-deflecting rakes overhanging and rotating above the binder-deck and that part of the conveyer which is located stubbleward from the vertical plane of the divider.

5. In combination with the platform-conveyer which moves and delivers the grain sidewise, and which extends stubbleward beyond the vertical plane of the inside divider and the binder-deck at the discharge side of the conveyer and at substantially the same level, the grain-deflecting rakes overhanging the inner end of the platform-conveyer and the binder-deck and operating in an orbit whose plane is inclined downward toward the front and toward the stubble side, and the butt-guide L, commencing close to the inside divider, extending thence stubbleward and rearward, and between the binder-gear standard and the binder-arm, substantially as set forth.

6. In combination with the platform-conveyer moving the grain sidewise from behind the sickle and extending stubbleward beyond the vertical plane of the inside divider, the binder-deck located at the delivery side of the conveyer and substantially at the same level, the bracket H, pivoted upon a vertical axis forward of the conveyer and stubbleward from the inside divider, the grain-deflecting rakes supported by the said bracket and overhanging the discharge end of the conveyer and the binder-deck and rotating in an orbit which is inclined downward toward the front and toward the stubble side, and the butt-guide rigidly secured to said bracket, and means, substantially as described, for swinging said bracket about its said vertical pivot, whereby the rear end of the butt-guide is moved toward and from the vertical plane of the needle, and simultaneously the deflecting-rakes are moved grainward and stubbleward.

7. In combination with the platform-conveyer and the binder-deck relatively arranged substantially as described, the vertical shaft G, journaled on the harvester-frame, having a power-communicating wheel, G', secured upon its upper end, the bracket H, pivoted upon said shaft below said wheel, having an arm, H', extended rearward over the discharge end of the conveyer, and a vertical bearing at the extremity of said arm and terminating below in the cam K, the rake-shaft journaled in said bearing and extending below it and having at its upper end a wheel receiving power from the wheel G', having at its lower end the collar, and the rakes pivoted to said collar and provided with the projections $k$, which overhang the cam K, whereby the movement of the said rakes is controlled, substantially as described.

In testimony whereof I hereunto set my hand, in the presence of two witnesses, at Chicago, Illinois.

GEORGE H. SPAULDING.

Witnesses:
WILFRED TWINCH,
J. F. STEWARD.